(12) United States Patent
Yokoyama

(10) Patent No.: US 11,163,648 B2
(45) Date of Patent: Nov. 2, 2021

(54) COMPUTER-READABLE RECORDING MEDIUM IN WHICH PROGRAM IS RECORDED, TERMINAL APPARATUS, AND COMMUNICATION SYSTEM

(71) Applicant: SEIKO EPSON CORPORATION, Tokyo (JP)

(72) Inventor: Daiki Yokoyama, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 126 days.

(21) Appl. No.: 16/121,478

(22) Filed: Sep. 4, 2018

(65) Prior Publication Data
US 2019/0073274 A1 Mar. 7, 2019

(30) Foreign Application Priority Data
Sep. 6, 2017 (JP) .............................. JP2017-171099

(51) Int. Cl.
*G06F 11/14* (2006.01)
*H04W 4/20* (2018.01)

(52) U.S. Cl.
CPC ...... *G06F 11/1464* (2013.01); *G06F 11/1456* (2013.01); *G06F 11/1461* (2013.01); *G06F 2201/84* (2013.01); *H04W 4/20* (2013.01)

(58) Field of Classification Search
CPC ............. G06F 11/1464; G06F 11/1456; G06F 11/1461
See application file for complete search history.

(56) References Cited

U.S. PATENT DOCUMENTS

| | | | | |
|---|---|---|---|---|
| 2004/0192260 | A1* | 9/2004 | Sugimoto | ............ G06F 11/1456 455/412.1 |
| 2010/0190445 | A1 | 7/2010 | Minami | |
| 2013/0326379 | A1* | 12/2013 | Arrasvuori | .............. H04W 4/80 715/764 |
| 2016/0295072 | A1 | 10/2016 | Nagasawa et al. | |
| 2017/0034329 | A1 | 2/2017 | Sakai | |
| 2017/0310849 | A1* | 10/2017 | Hosoda | ................ H04N 1/4426 |
| 2017/0331329 | A1* | 11/2017 | Kim | ........................ H02J 50/12 |

FOREIGN PATENT DOCUMENTS

| | | |
|---|---|---|
| JP | 2002-297888 | 10/2002 |
| JP | 2010-177938 | 8/2010 |
| JP | 2010-266995 A | 11/2010 |
| JP | 2015-171036 | 9/2015 |
| JP | 2016-197335 | 11/2016 |
| JP | 2017-034297 | 2/2017 |

* cited by examiner

*Primary Examiner* — Grace Park
(74) *Attorney, Agent, or Firm* — Workman Nydegger

(57) ABSTRACT

There is provided a non-transitory computer-readable recording medium in which a program is recorded, the program causing a computer to function as: a communication unit that receives a beacon signal from an electronic apparatus; and a processing unit that controls communication of the communication unit, in which the processing unit performs notification processing of a backup function of backup data into the electronic apparatus in a case where it is determined that the electronic apparatus from which the beacon signal is transmitted is an apparatus having a backup function and that a distance from the electronic apparatus is equal to or smaller than a predetermined threshold value based on a reception radio wave intensity of the beacon signal.

15 Claims, 13 Drawing Sheets

| TRANSMISSION SOURCE ADDRESS | IDENTIFICATION INFORMATION OF ELECTRONIC APPARATUS | INFORMATION INDICATING PRESENCE OR ABSENCE OF BACKUP FUNCTION | RADIO WAVE INTENSITY AS REFERENCE OF DISTANCE |

COMPUTER-READABLE RECORDING MEDIUM IN WHICH PROGRAM IS RECORDED, TERMINAL APPARATUS, AND COMMUNICATION SYSTEM

BACKGROUND

1. Technical Field

The present invention relates to a non-transitory computer-readable recording medium in which a program is recorded, a terminal apparatus, and a communication system.

2. Related Art

A method of transmitting data stored in a terminal apparatus to other apparatus and storing (backing up) the data in the other apparatus is widely known. For example, a printer having a function of backing up pictures captured by a portable terminal apparatus such as a smartphone is known.

JP-A-2010-266995 discloses a method in which, when a mail is transmitted from a computer (PC) to a printer via a network (LAN), the printer stores an image attached in the mail into a server.

JP-A-2010-266995 discloses an example of executing backup by transmitting the picture from the smartphone to the printer via a LAN. On the other hand, a method of executing backup via wireless communication instead of LAN is also known.

Backup by wireless communication is highly convenient to a user. Here, unless a user actively executes a backup function by using an application program, there is a problem that the picture is not transmitted to the printer and backup is not executed. For example, even in a situation where necessity of backup is high in the terminal apparatus, such as a case where the number of pictures of the smartphone is increased, in the method in related art, backup is not executed unless a user actively performs an operation.

SUMMARY

An advantage of some aspects of the invention is to provide a non-transitory computer-readable recording medium in which a program is recorded, a terminal apparatus, and a communication system capable of backing up data by using a beacon signal in a highly convenient manner.

According to an aspect of the invention, there is provided a non-transitory computer-readable recording medium in which a program is recorded, the program causing a computer to function as: a communication unit that receives a beacon signal from an electronic apparatus; and a processing unit that controls communication of the communication unit, in which the processing unit performs notification processing of a backup function of backup data into the electronic apparatus in a case where it is determined that the electronic apparatus from which the beacon signal is transmitted is an apparatus having a backup function and that a distance from the electronic apparatus is equal to or smaller than a predetermined threshold value based on a reception radio wave intensity of the beacon signal.

In the non-transitory computer-readable recording medium, when it is determined that a terminal apparatus approaches the electronic apparatus based on the beacon signal, in response to the approach, the processing unit performs the notification processing of the backup function. In this case, a user can be prevented from being forced to perform a complicated backup operation, and thus it is possible to allow the user to use the backup function in a highly convenient manner.

In the non-transitory computer-readable recording medium, the notification processing of the backup function may include at least one of notification processing of prompting an execution of backup and function-guide notification processing of guiding the backup function.

In this case, it is possible to prompt a user to execute backup by the notification processing and allow a user to recognize details of the backup function.

In the non-transitory computer-readable recording medium, the processing unit may determine whether or not the electronic apparatus from which the beacon signal is transmitted is an apparatus having the backup function based on information included in the beacon signal.

In this case, it is possible to determine whether or not the electronic apparatus has a backup function based on the beacon signal.

In the non-transitory computer-readable recording medium, the processing unit may obtain the distance from the electronic apparatus based on the reception radio wave intensity of the beacon signal, and perform the notification processing of the backup function in a case where the obtained distance is equal to or smaller than the predetermined threshold value.

In this case, the terminal apparatus can estimate a distance from the electronic apparatus.

In the non-transitory computer-readable recording medium, the processing unit may perform function-guide notification processing of guiding a fact that the electronic apparatus has the backup function when the beacon signal is received from the electronic apparatus for the first time.

In this case, in a situation where a probability that a user does not know the backup function is high, it is possible to appropriately perform the function-guide notification processing.

In the non-transitory computer-readable recording medium, the processing unit may perform the notification processing of prompting an execution of backup when the beacon signal is received from the electronic apparatus for a second or subsequent time.

In this case, it is possible to prompt a user to execute backup at an appropriate timing.

In the non-transitory computer-readable recording medium, the notification processing of the backup function may be notification processing of prompting an execution of backup, and in a case where a backup execution operation by a user is not performed after the notification processing of prompting an execution of the backup, the processing unit may stop the notification processing until it is determined that the distance from the electronic apparatus exceeds a second threshold value equal to or larger than the threshold value.

In this case, in a situation where it is assumed that a user does not want the notification processing of prompting an execution of backup, it is possible to prevent unnecessary notification processing from being performed.

In the non-transitory computer-readable recording medium, the processing unit may acquire setting information indicating use or non-use of automatic backup, and the processing unit may skip the notification processing and perform processing of transmitting a backup request to the electronic apparatus in a case where it is determined that the distance is equal to or smaller than the predetermined threshold value and it is determined that the automatic backup is available based on the setting information.

In this case, it is possible to execute backup in a more highly convenient manner.

In the non-transitory computer-readable recording medium, the beacon signal may be a signal based on a Bluetooth communication standard.

In this case, the Bluetooth beacon signal (advertise packet) can be used for searching of the electronic apparatus and estimation of the distance.

In the non-transitory computer-readable recording medium, the processing unit may perform processing of transmitting the backup data to the electronic apparatus by using communication based on a communication standard different from a communication standard of the beacon signal.

In this case, by changing the communication standard in transmission and reception of the beacon signal and transmission and reception of the backup data, it is possible to transmit the backup data at high speed.

According to another aspect of the invention, there is provided a non-transitory computer-readable recording medium in which a program is recorded, the program causing a computer to function as: a communication unit that receives a beacon signal from an electronic apparatus; and a processing unit that controls communication of the communication unit, in which the processing unit performs automatic backup processing of backup data into the electronic apparatus in a case where it is determined that the electronic apparatus from which the beacon signal is transmitted is an apparatus having a backup function and that a distance from the electronic apparatus is equal to or smaller than a predetermined threshold value based on a reception radio wave intensity of the beacon signal.

In the non-transitory computer-readable recording medium, when it is determined that a terminal apparatus approaches the electronic apparatus based on the beacon signal, in response to the approach, the processing unit executes automatic backup. In this case, a user is not forced to perform a complicated operation, and thus it is possible to allow the user to use the backup function in a highly convenient manner.

According to still another aspect of the invention, there is provided a terminal apparatus including: a communication unit that receives a beacon signal from an electronic apparatus; and a processing unit that controls communication of the communication unit, in which the processing unit performs notification processing of a backup function of backup data into the electronic apparatus in a case where it is determined that the electronic apparatus from which the beacon signal is transmitted is an apparatus having a backup function and that a distance from the electronic apparatus is equal to or smaller than a predetermined threshold value based on a reception radio wave intensity of the beacon signal.

According to still another aspect of the invention, there is provided a communication system including: the terminal apparatus; and an electronic apparatus that has a backup function and transmits a beacon signal.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, the present embodiment will be described. The present embodiment to be described below is not intended to limit contents of the invention described in the claims. In addition, all of configurations to be described in the present embodiment are not necessarily required in the invention.

1. Communication System

Figure 1:
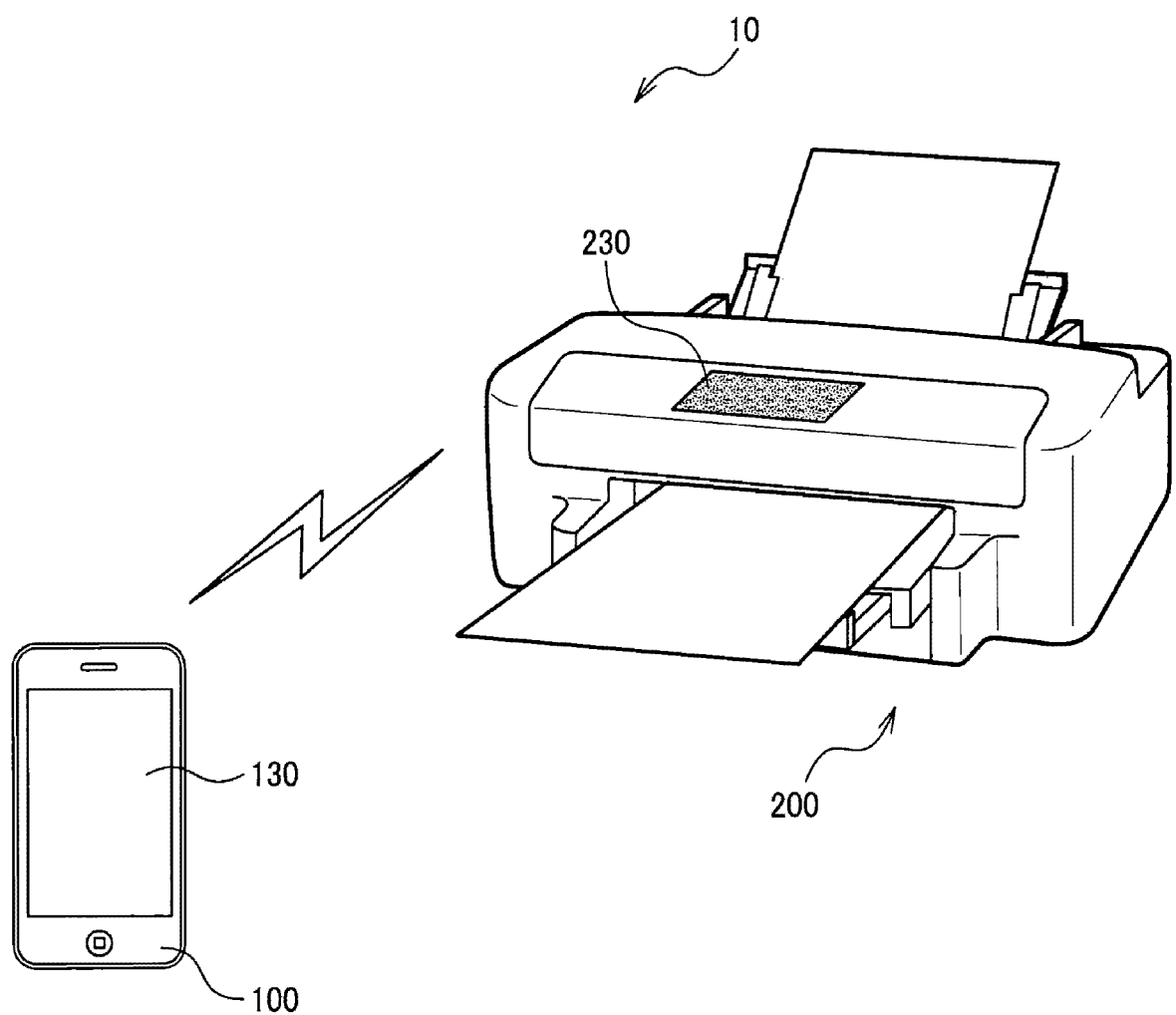
FIG. 1 is a configuration example of a communication system including a terminal apparatus and an electronic apparatus.

FIG. 1 is a diagram schematically illustrating an example of a communication system 10 according to the invention. The communication system 10 includes a terminal apparatus 100 and an electronic apparatus 200. The terminal apparatus 100 is, for example, a portable terminal apparatus such as a smartphone. The electronic apparatus 200 is, for example, a printer (printing apparatus). Here, the electronic apparatus 200 according to the present embodiment may be any one of a scanner, a facsimile apparatus, and a copier, or may be a multifunction peripheral (MFP) having a plurality of functions of a printer and the above-mentioned apparatuses. The communication system 10 is not limited to the configuration of FIG. 1, and various modifications such as addition of other components may be made. For example, although one terminal apparatus 100 is illustrated in FIG. 1, a plurality of terminal apparatuses 100 may be connected to one electronic apparatus 200. In addition, even in FIGS. 2 and 3 to be described later, modifications such as omission or addition of components may be similarly made.

The terminal apparatus 100 and the electronic apparatus 200 can perform wireless communication. Here, the wireless communication is communication based on a Bluetooth (registered trademark) standard, and in a narrow sense, is communication based on a Bluetooth Low Energy (BLE) standard. The terminal apparatus 100 and the electronic apparatus 200 can also perform wireless communication based on a standard different from BLE, for example, communication based on a Wi-Fi (registered trademark) standard.

Figure 2:
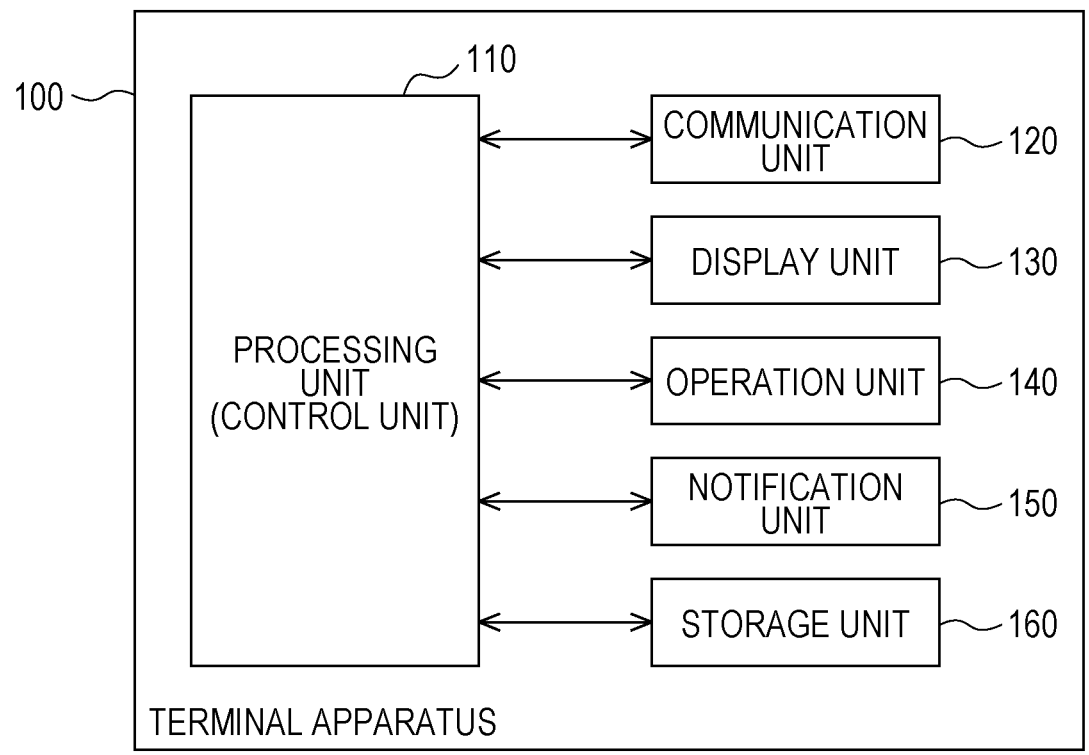
FIG. 2 is a configuration example of the terminal apparatus.

FIG. 2 is a block diagram illustrating an example of a configuration of the terminal apparatus 100. The terminal apparatus 100 includes a processing unit 110 (processor), a communication unit 120 (communication interface), a display unit 130 (display), an operation unit 140 (operation buttons or the like), a notification unit 150 (notification interface), and a storage unit 160 (memory).

The processing unit 110 (processor, controller) controls each unit of the communication unit 120, the display unit 130, the operation unit 140, the notification unit 150, and the storage unit 160.

In the present embodiment, each processing (each function) to be performed by each unit of the processing unit 110 may be realized by a processor (processor including hardware). For example, in the present embodiment, each processing may be realized by a processor that operates based on information such as a program and a storage device (memory) that stores information such as a program. Here, in the processor, for example, a function of each unit may be realized by individual hardware, or a function of each unit may be realized by integrated hardware. For example, the processor may include hardware, and the hardware may include at least one of a circuit for processing a digital signal and a circuit for processing an analog signal. For example, the processor may be configured with one or a plurality of circuit devices (for example, ICs or the like) mounted on a circuit board, or one or a plurality of circuit elements (for example, resistors, capacitors, or the like). The processor may be, for example, a CPU. Here, the processor is not limited to a CPU, and various processors such as a graphics processing unit (GPU) or a digital signal processor (DSP) may be used. In addition, the processor may be configured with a hardware circuit using an ASIC. In addition, the processor may be configured with a plurality of CPUs, or may be configured with hardware circuits using a plurality of ASICs. In addition, the processor may be configured by a combination of a plurality of CPUs and hardware circuits using a plurality of ASICs. In addition, the processor may include an amplifier circuit, a filter circuit, or the like for processing an analog signal. The memory may be a semiconductor memory such as an SRAM or a DRAM, may be a register, may be a magnetic storage device such as a hard disk device, or may be an optical storage device such as an optical disk device. For example, the memory stores a computer-readable instruction. The instruction is executed by the processor, and thus a function of each unit (the communication unit, the processing unit, and the like) of the terminal apparatus 100 is realized. Here, the instruction may be an instruction of an instruction set of a program, or an instruction for instructing a hardware circuit of a processor to perform an operation. For example, the storage unit 160 stores an operating system (OS) and application software, and the processing unit 110 controls each unit by an operation based on the OS or the like.

The communication unit 120 (wireless communication unit) is realized by at least one communication device (wireless communication device). The communication unit 120 includes a wireless communication device (wireless communication chip) that executes wireless communication based on a BLE standard. Here, the communication unit 120 may include a wireless communication device that executes wireless communication based on a standard other than the BLE standard.

The display unit 130 is configured with a display or the like that displays various kinds of information to a user, and the operation unit 140 is configured with a button or the like that receives an input operation from a user. The display unit 130 and the operation unit 140 may be integrally configured with, for example, a touch panel. The notification unit 150 performs notification to the user. The notification unit 150 may be configured with, for example, a speaker for notification using a sound, a vibration unit (vibration motor) for notification using a vibration, or a combination of a speaker and a vibration unit.

The storage unit 160 (storage device) is configured with a storage medium such as a hard disk drive (HDD), a read only memory (ROM), or a random access memory (RAM). The storage unit 160 stores data, which is to be backed up in the electronic apparatus 200. For example, the terminal apparatus 100 includes an imaging unit (camera) (not illustrated), and the storage unit 160 stores image data (including a still image and a moving image) captured by the imaging unit.

Figure 3:
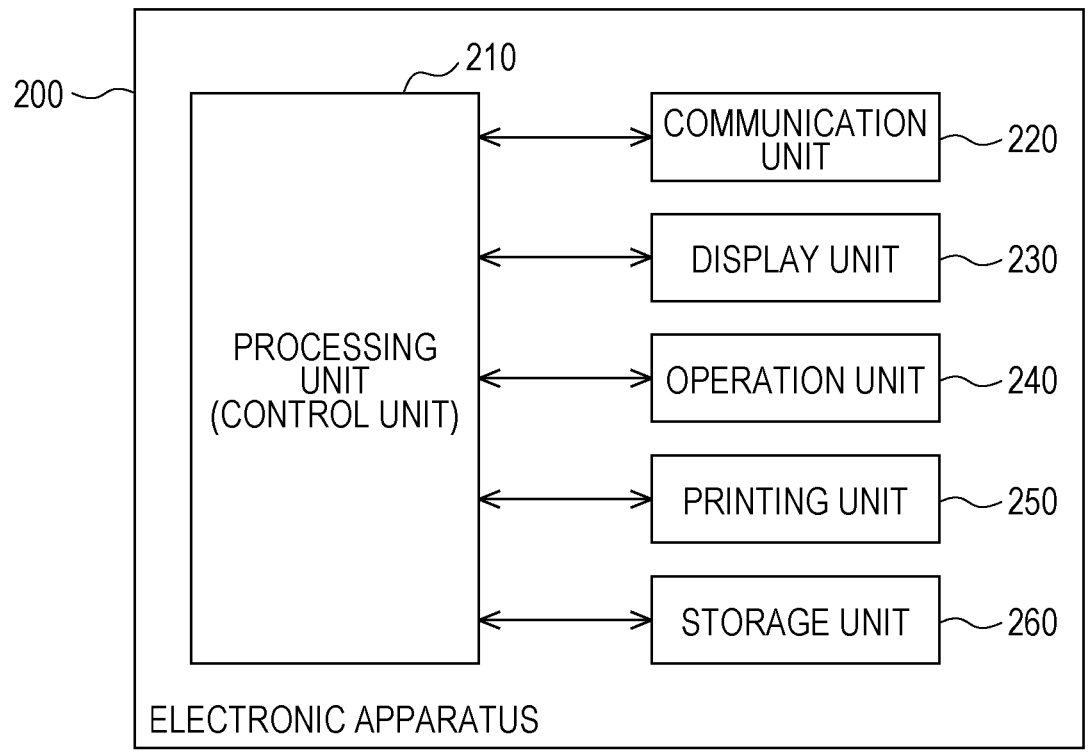
FIG. 3 is a configuration example of the electronic apparatus.

FIG. 3 is a block diagram illustrating an example of a configuration of the electronic apparatus 200. FIG. 3 illustrates an electronic apparatus 200 (printer) having a printing function. In the following description, an example in which the electronic apparatus 200 is a printer will be described. Here, as described above, the electronic apparatus 200 may be extended to an apparatus other than a printer. The electronic apparatus 200 includes a processing unit 210 (processor), a communication unit 220 (communication interface), a display unit 230 (display), an operation unit 240 (operation panel), a printing unit 250, and a storage unit 260 (memory).

The processing unit 210 (processor, controller) controls each unit of the communication unit 220, the display unit 230, the operation unit 240, the printing unit 250, and the storage unit 260, and collectively controls operations to be executed by the electronic apparatus 200 (printer). In the present embodiment, each processing (each function) to be performed by each unit of the processing unit 210 may be realized by a processor (processor including hardware). For example, in the present embodiment, each processing may be realized by a processor that operates based on information such as a program and a storage device (memory) that stores information such as a program.

The communication unit 220 (wireless communication unit) is realized by at least one communication device (wireless communication device). The communication unit 220 includes a wireless communication device (wireless communication chip) that executes communication based on a BLE standard. Here, the communication unit 220 may include a wireless communication device that executes wireless communication based on a standard other than the BLE standard.

The display unit 230 is configured with a display or the like that displays various kinds of information to a user, and the operation unit 240 is configured with a button or the like that receives an input operation from a user. The display unit 230 and the operation unit 240 may be integrally configured with, for example, a touch panel.

The printing unit 250 includes a printing engine. The printing engine is a mechanical configuration for executing printing of an image on a print medium. The printing engine includes, for example, a transport mechanism, an ink jet type ejection head, and a drive mechanism of a carriage including the ejection head. The printing engine prints an image on a print medium by ejecting an ink from the ejection head onto the print medium (paper or cloth) transported by the transport mechanism. A specific configuration of the printing engine is not limited to the configuration described in the present embodiment, and may be a configuration in which printing is performed with toner by a laser method. In addition, the printing unit 250 may include sensors that detect various kinds of physical quantities related to an operation state of the printing engine, and counters that count detection results, and the like. By using the sensors and the counters, it is possible to acquire information such as a drive amount of the transport mechanism (a rotation amount of the motor), the number of reciprocations of the ejection head, a consumption amount of the ink, and the like.

The storage unit 260 (storage device) is configured with a storage medium such as an HDD, a ROM, or a RAM. The storage unit 260 stores data which is output from the printing unit 250, as information indicating an operation status of the printer.

In addition, the storage unit 260 may store backup data transmitted from the terminal apparatus 100. Here, the backup data is not necessarily stored in the storage unit 260 included in the electronic apparatus 200. For example, the electronic apparatus 200 may include an interface (not illustrated), and the backup data may be stored in an external storage device connected via the interface. For example, the external storage device may be an HDD or a solid state drive (SSD) connected by Universal Serial Bus (USB), may be a flash memory, may be an SD card inserted in a card slot (including a storage device such as a micro SD card with an associated standard), or may be another storage device connectable to the electronic apparatus 200.

2. Notification Processing Related to Backup

2.1 Outline

As described above, the electronic apparatus 200 (printer) has a backup function, and can store data transmitted from the terminal apparatus 100. By backing up the data in the electronic apparatus 200, the data can be deleted in the terminal apparatus 100, and thus a free space of the storage unit 160 can be increased. In addition, in a case where the data of the terminal apparatus 100 is used in the electronic apparatus 200, specifically, in a case where a picture captured by the terminal apparatus 100 is printed by the printer, it is necessary to transmit print data to the electronic apparatus 200. By backing up picture data in the printer in advance, there is no need to transmit data from the terminal apparatus 100 to the printer when printing. Therefore, it is possible to reduce a network load and to execute high-speed printing. In a case where a print operation is performed using the operation panel (operation unit 240) of the printer, there is no need to carry the terminal apparatus 100 when printing.

In addition, by automating the backup processing to some extent, it is possible to further improve convenience of a user. For example, the processing unit 110 of the terminal apparatus 100 automatically selects data (image file) to be backed up. For example, the processing unit 110 holds a previous backup history, and selects data that is not backed up as backup data. In this case, a user does not need to select target data when executing backup, and thus it is possible to automate a part of backup processing.

Here, it is considered that some users who use the electronic apparatus 200 do not have sufficient knowledge on computers and networks. Executing backup by operating the terminal apparatus 100 is not easy to such a user. For example, some users have difficulty in performing operations such as finding and selecting items for backup from a menu of application software.

Further, various types of electronic apparatuses are sold from various manufacturers as the electronic apparatus 200, and as a result, there is a possibility that some users may not know whether or not the electronic apparatus 200 used by themselves has a backup function. In addition, it is considered that some users do not know specific contents of processing performed by the backup function and advantages of the backup function.

As described above, even in a case where the communication system 10 (the terminal apparatus 100 and the electronic apparatus 200) having a backup function is simply configured, in some cases, the backup function may not appropriately used. Therefore, in the present embodiment, when the terminal apparatus 100 approaches the electronic apparatus 200, in response to the approach, the terminal apparatus 100 performs notification processing of the backup function.

As illustrated in FIG. 2, the terminal apparatus 100 includes the communication unit 120 that receives a beacon signal from the electronic apparatus 200, and the processing unit 110 that controls communication of the communication unit 120. In a case where it is determined that the electronic apparatus 200 from which the beacon signal is transmitted is an apparatus having a backup function and that a distance between the terminal apparatus 100 and the electronic apparatus 200 is equal to or smaller than a predetermined threshold value based on a reception radio wave intensity of the beacon signal, the processing unit 110 performs notification processing of the backup function of the backup data into the electronic apparatus 200.

According to the method of the present embodiment, when the terminal apparatus 100 approaches the electronic apparatus 200, in response to the approach, it is possible to perform notification processing for a user. In this case, it is possible to execute backup by a simple procedure as compared with a case where a user voluntarily starts an operation for backup. For example, when a user voluntarily starts an operation for backup, the user needs to activate application software, perform an operation for a screen transition from a home screen to a backup execution start screen, and press an execution start button. In the operation for a screen transition, the user needs to select an appropriate item from a plurality of items, and to press a button more than once in many cases. As a result, the user has difficulty in performing backup. On the other hand, according to the method of the present embodiment, in a case where the terminal apparatus 100 approaches the electronic apparatus 200, it is also possible to perform processing of directly displaying a backup execution start screen. Therefore, even users with poor knowledge on computers can execute backup appropriately.

Figure 4:
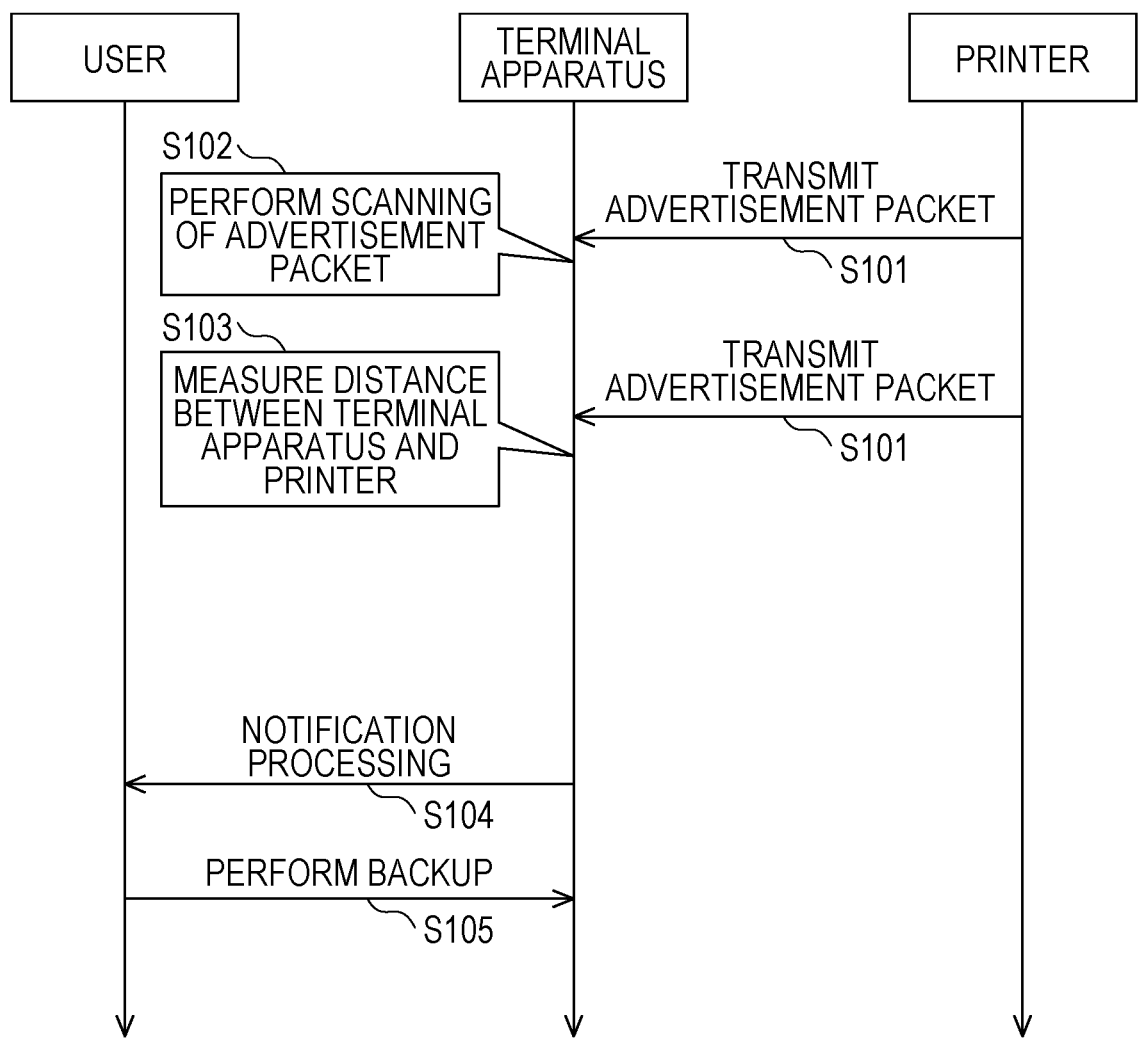
FIG. 4 is a sequence diagram for explaining processing according to the present embodiment.

FIG. 4 is a sequence diagram for explaining processing according to the present embodiment. The electronic apparatus 200 periodically outputs a beacon signal (S101). Here, the beacon signal is a signal which is transmitted using wireless communication, and is a signal which is used for acquiring information such as a position and confirming the presence of an apparatus. The beacon signal is transmitted, for example, without specifying a transmission destination terminal, and is received by a reception terminal existing within a range. Here, the beacon signal is a signal based on a Bluetooth communication standard, and specifically, is an advertisement packet which is used for broadcasting data.

On the other hand, the beacon signal can be extended to a broadcast signal (SSID broadcast) based on a Wi-Fi communication standard.

The terminal apparatus 100 performs scanning of an advertisement packet (S102), and measures (estimates) a distance between the terminal apparatus 100 and the electronic apparatus 200 based on the received advertisement packet (S103). In a case where the estimated distance is equal to or smaller than a predetermined threshold value, the terminal apparatus 100 performs notification processing for a user (S104), and in a case where an operation of a user is performed in response to the notification, the terminal apparatus 100 executes backup processing (S105).

Here, the notification processing of the backup function includes at least one of notification processing of prompting an execution of backup and function-guide notification processing of guiding the backup function. Hereinafter, each notification processing will be described in detail. Thereafter, distance estimation processing based on the reception radio wave intensity of the beacon signal, a modification example of the distance estimation processing, a specific example of backup processing, and a flowchart of processing in each of the terminal apparatus 100 and the electronic apparatus 200 will be described.

2.2 Notification Processing of Prompting Execution of Backup

From a viewpoint of security, it is not preferable that the data stored in the terminal apparatus 100 is transmitted to the electronic apparatus 200 without a user's permission. For this reason, it is considered that processing of displaying the backup execution start screen or processing of selecting the backup data is automated but backup is executed in response to a user's operation. In this case, the terminal apparatus 100 performs notification processing of prompting an execution of backup as notification processing of the backup function.

Figure 5:
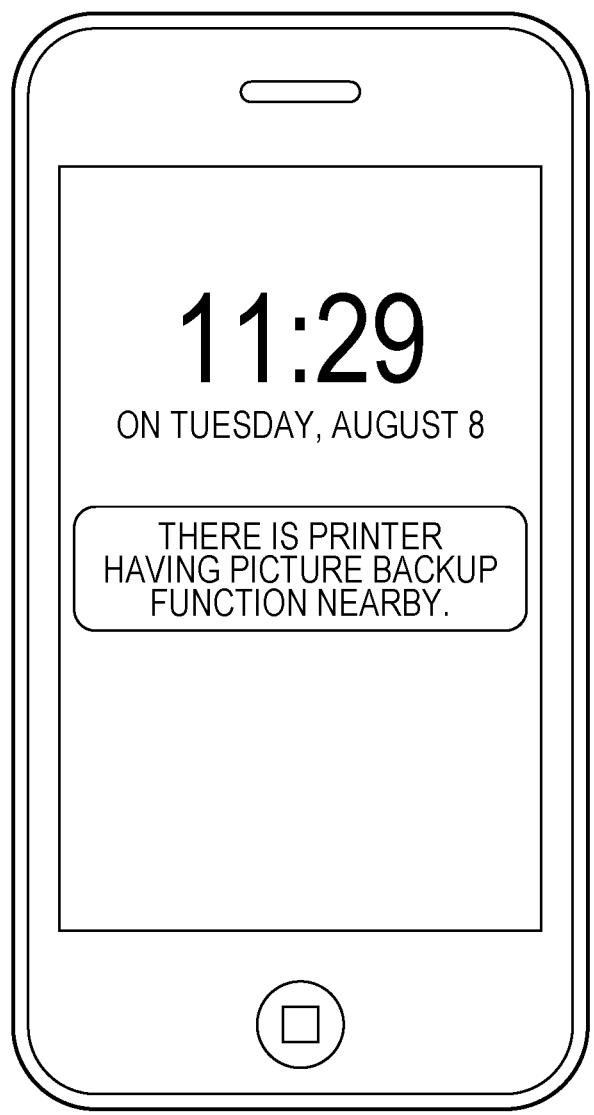
FIG. 5 is an example of a display screen displayed on the terminal apparatus.
Figure 6:
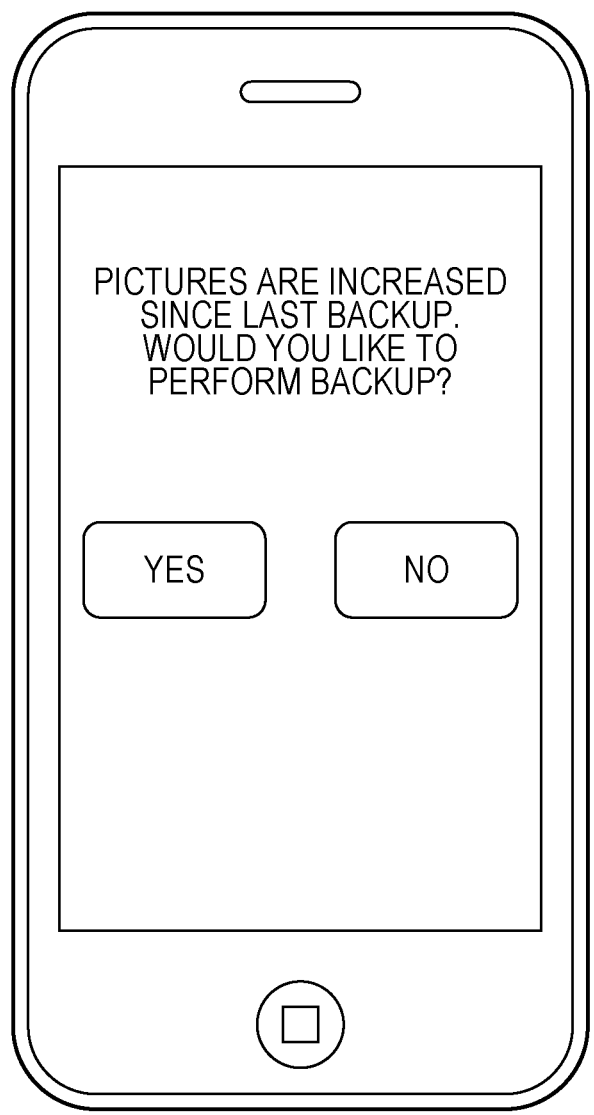
FIG. 6 is an example of a display screen used in notification processing of prompting an execution of backup.

FIG. 5 and FIG. 6 are examples of display screens displayed on the display unit 130 of the terminal apparatus 100. FIG. 5 is an example of a screen displayed on a home screen (or a lock screen) of the terminal apparatus 100 in a case where it is determined that the distance between the terminal apparatus 100 and the electronic apparatus 200 is equal to or smaller than a predetermined threshold value. In the example of FIG. 5, the display unit 130 displays a fact that a printer having a backup function exists near the terminal apparatus 100 by using text information.

In a case where an operation to touch a button (text display region) is performed by the user, the display unit 130 displays a screen illustrated in FIG. 6. FIG. 6 is an example of a display screen (backup execution start screen) for prompting backup, and in FIG. 6, text information indicating a message "Do you want to execute backup?" and two buttons of "Yes" and "No" are displayed on the display screen. In a case where the "Yes" button is touched (pressed), the processing unit 110 executes backup processing, and in a case where the "No" button is touched, the processing unit 110 does not execute backup processing.

In this case, by displaying the display screen, it is possible to prompt a user to execute backup. Here, the terminal apparatus 100 may perform notification in a display mode different from the display by using the notification unit 150. For example, a speaker of the notification unit 150 outputs a sound of the same text illustrated in FIG. 6. In addition, the notification unit 150 may perform notification using a vibration by a vibration unit or using light emission of a light emitting unit (LED or the like). Here, the vibration or the light emission is not related to a backup function. Therefore, it is preferable to notify a user of a relationship between a backup function and a vibration or light emission with a predetermined pattern in advance, or to perform display or sound output together with a vibration and light emission.

The processing unit 110 of the terminal apparatus 100 may determine whether or not backup data is increased, and in response to an increase of backup data, may perform notification processing of prompting an execution of backup. In the case of backing up data with a predetermined format among the data stored in the storage unit 160 of the terminal apparatus 100, the processing unit 110 determines whether or not an amount of data with the format (number of files or data size) that is not backed up is increased. In a case of an example of backing up pictures captured by the terminal apparatus 100, when the number of pictures that are not backed up is increased, notification processing of prompting an execute of backup is performed. FIG. 6 is an example of a display screen in this case, and in FIG. 6, a text "Pictures are increased since last backup" is displayed together with a text prompting backup.

In addition, the beacon signal is a signal used for various purposes. For this reason, in some cases, the electronic apparatus 200 that does not have a backup function may output a beacon signal for a purpose different from backup. In other words, preferably, the terminal apparatus 100 does not perform notification processing related to a backup function (and function-guide notification processing of guiding a fact that the electronic apparatus 200 has a backup function) immediately upon reception of the beacon signal, and determines whether or not the electronic apparatus 200 has a backup function.

Specifically, the processing unit 110 of the terminal apparatus 100 determines whether or not the electronic apparatus 200 from which the beacon signal is transmitted is an apparatus having a backup function based on information included in the beacon signal. In a case where it is determined that the electronic apparatus 200 has a backup function, the processing unit 110 performs processing of displaying a screen illustrated in FIG. 5.

Figures 7, 8:
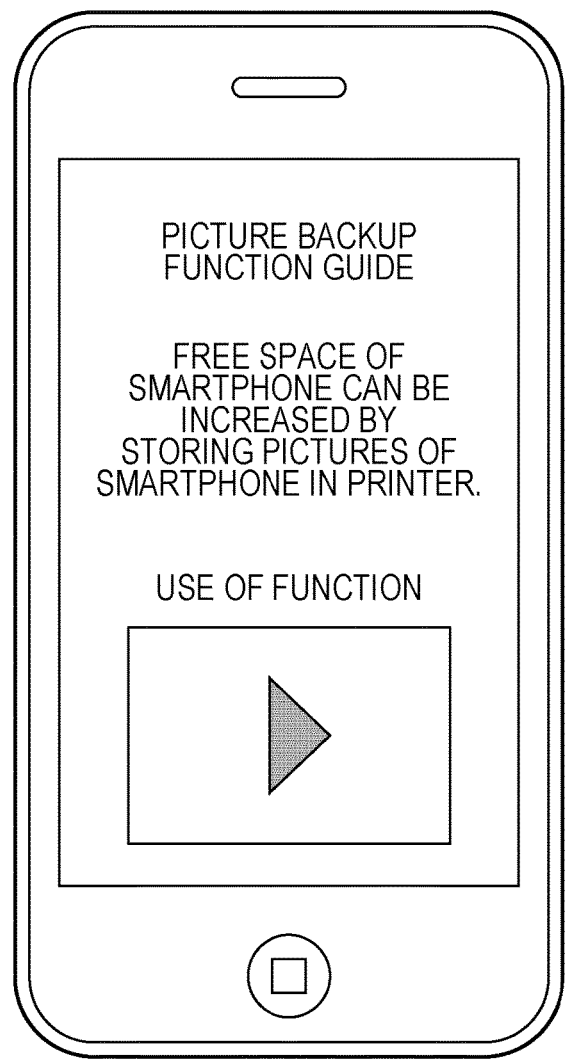
FIG. 7 is an example of a data structure of a beacon signal (advertisement packet).
FIG. 8 is an example of a display screen used in function-guide notification processing.

FIG. 7 is an example of a data structure of a beacon signal (advertisement packet) transmitted by the electronic apparatus 200. FIG. 7 illustrates a part of the data structure of the beacon signal, and the beacon signal may include other data. In addition, a part of the data in FIG. 7 may be omitted.

As illustrated in FIG. 7, the beacon signal includes a transmission source address, identification information of the electronic apparatus 200, information indicating the presence or absence of a backup function, and information indicating a radio wave intensity as a reference of a distance. The transmission source address is address information indicating a transmission source of the beacon signal, and is, for example, an address of a Bluetooth apparatus. The identification information of the electronic apparatus 200 is information for uniquely specifying the electronic apparatus 200 as a transmission source, and is, for example, a MAC address. The information indicating the presence or absence of a backup function is, for example, one-bit flag information. In a case where the information is set to a first logic level (for example, logical level "1"), the information indicates that the electronic apparatus 200 has a backup function, and in a case where the information is set to a second logic level (for example, logical level "0"), the information indicates that the electronic apparatus 200 does not have a backup function. The information indicating a radio wave intensity as a reference of a distance is information used for estimation of the distance between the terminal apparatus 100 and the electronic apparatus 200 by the processing unit 110, and will be described later.

In the example of FIG. 7, in a case where the beacon signal is received, the processing unit 110 refers to the information indicating the presence or absence of a backup function. In a case where the information (flag) is set to the first logic level, the processing unit 110 determines that the electronic apparatus 200 has a backup function, and performs processing of displaying a display screen of FIG. 5 or FIG. 6. In a case where the information (flag) is set to the second logic level, the processing unit 110 determines that the electronic apparatus 200 does not have a backup function, and does not perform notification processing. In this case, the terminal apparatus 100 can execute appropriate notification processing according to the presence or absence of a backup function of the electronic apparatus 200.

2.3 Function-Guide Notification Processing of Guiding Backup Function

By performing notification processing exemplified in FIG. 6, the terminal apparatus 100 can prompt a user to execute backup. Here, some users may not know a fact that the electronic apparatus 200 has a backup function itself. In a case of such a user, when executing backup, a probability that the user does not know specific contents of processing performed by the backup function is high. As a result, even when the screen of FIG. 6 is displayed, the user may feel resistance in touching the "Yes" button.

Therefore, in the present embodiment, the terminal apparatus 100 performs function-guide notification processing of guiding a backup function, as notification processing of a backup function. The function-guide notification processing of guiding a backup function is notification processing of guiding specific contents of a backup function. For example, in the notification processing, the terminal apparatus 100 notifies a user of specific processing contents in which backup data is transmitted to the electronic apparatus 200 and is stored in the electronic apparatus 200, an advantage when backing up data in the electronic apparatus 200, and an operation procedure for executing the backup function, and the like.

FIG. 8 is an example of a display screen displayed on the display unit 130 of the terminal apparatus 100 when performing the function-guide notification processing. For example, in a case where it is determined that the distance between the terminal apparatus 100 and the electronic apparatus 200 is equal to or smaller than the predetermined threshold value, the screen illustrated in FIG. 5 is displayed, and in a case where the user performs a button touch operation, the screen illustrated in FIG. 8 is displayed.

In the example of FIG. 8, an outline of a backup function of storing picture data of the terminal apparatus 100 (smartphone) in the electronic apparatus 200 (printer), and an advantage that a free space of the storage unit 160 can be increased are explained by using text information. Further, a window for displaying a moving image is provided, and an operation procedure for executing the backup function is explained by using the moving image. For example, in a case where an operation to touch an inside of the window is performed, playback of the moving image is started.

By using the display screen of FIG. 8, it is possible to guide a user through details of the backup function. Therefore, even users with poor knowledge on a backup function can use the backup function appropriately.

Here, it is not preferable to display the screen illustrated in FIG. 8 every time the terminal apparatus 100 approaches the electronic apparatus 200. It is considered that a user who has already viewed the screen of FIG. 8 has knowledge on a backup function, and as a result, when the screen is repeatedly displayed, the user may feel annoyance instead.

Therefore, when the beacon signal is received from the electronic apparatus 200 for the first time, the processing unit 110 of the terminal apparatus 100 performs function-guide notification processing of guiding a fact that the electronic apparatus 200 has a backup function. In this case, in a situation where a probability that a user does not know the backup function is high, it is possible to execute the function-guide notification processing. In addition, in a situation where a probability that a user does not know the backup function is low, it is possible to skip the function-guide notification processing. That is, it is possible to perform the function-guide notification processing in an appropriate situation, and to skip the function-guide notification processing that is felt by a user as annoyance.

When the beacon signal is received from the electronic apparatus 200 for a second or subsequent time, the processing unit 110 performs notification processing (for example, display of FIG. 6) prompting a user to execute backup. In this configuration, after a guide of a backup function is performed for a user, by prompting the user to execute backup, it is possible to allow the user to appropriately use the backup function.

Here, the storage unit 160 of the terminal apparatus 100 stores reception history information of the beacon signal, and the processing unit 110 determines whether reception of the beacon signal is a first time or a second or subsequent time based on the history information. Alternatively, the storage unit 160 of the terminal apparatus 100 may store execution history information of the function-guide notification processing. In a case where the function-guide notification processing is not executed, the processing unit 110 determines that reception of the beacon signal is a first time, and executes the function-guide notification processing. In a case where the function-guide notification processing is already executed, the processing unit 110 determines that reception of the beacon signal is a second or subsequent time, and executes the notification processing of prompting a user to execute backup.

Although the function-guide notification processing of guiding a backup function is described with reference to FIG. 8, the terminal apparatus 100 can perform function-guide notification processing of guiding other functions of the electronic apparatus 200. For example, in a case where the electronic apparatus 200 is a multifunction peripheral having functions of a scanner and a facsimile apparatus, the terminal apparatus 100 performs processing of guiding a scan function and a facsimile function.

Figure 9:
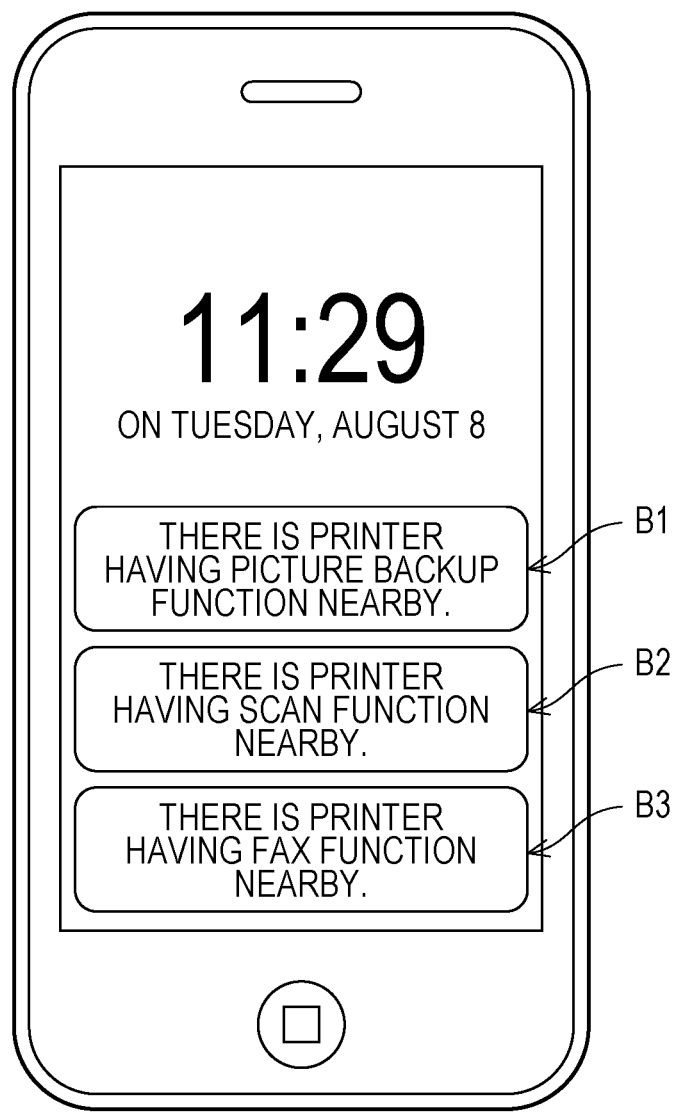
FIG. 9 is an example of a display screen used in function-guide notification processing of guiding a function other than a backup function.
Figure 10:
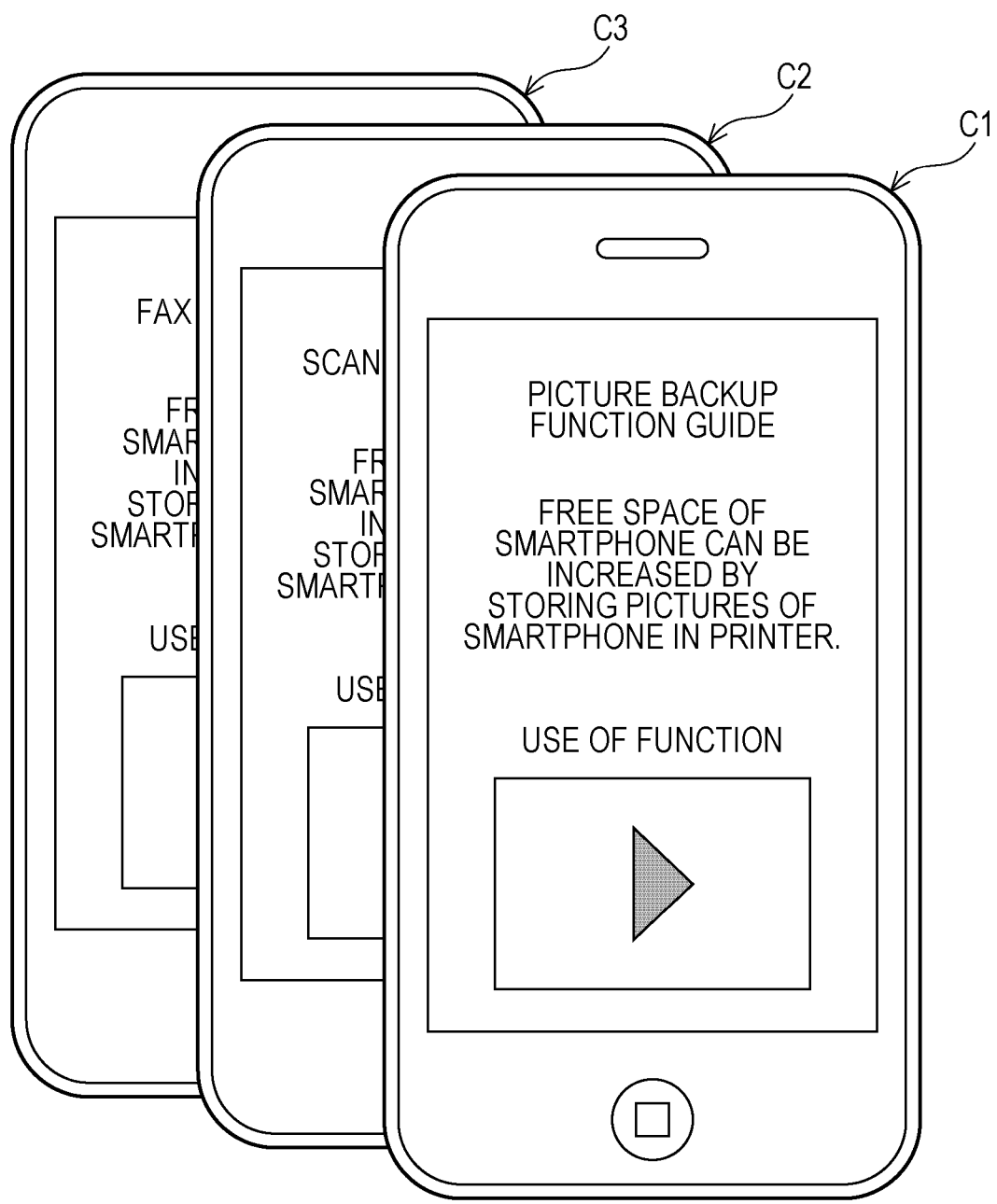
FIG. 10 is an example of a display screen used in function-guide notification processing of guiding a function other than a backup function.

FIG. 9 is an example of a screen displayed on the display unit 130 of the terminal apparatus 100 in a case where the terminal apparatus 100 approaches the electronic apparatus 200 having functions of a scanner and a facsimile apparatus. FIG. 10 is an example of a screen displayed on the display unit 130 of the terminal apparatus 100 in a case where an operation to touch a button illustrated in FIG. 9 is performed.

In FIG. 9, the terminal apparatus 100 performs notification (region B1) indicating a fact that there is an electronic apparatus 200 (printer) having a backup function, notification (region B2) indicating a fact that there is a printer having a scan function, and notification (region B3) indicating a fact that there is a printer having a facsimile function.

When an operation to touch the region B1 is performed, as illustrated in C1 of FIG. 10, function-guide notification processing of guiding a backup function is performed in the same display manner as that in FIG. 8. Similarly, when an operation to touch the region B2 is performed, function-guide notification processing of guiding a scan function is performed (C2), and when an operation to touch the region B3 is performed, function-guide notification processing of guiding a facsimile function is performed (C3).

2.4 Distance Determination and Threshold Value

Next, processing of determination of a distance based on the beacon signal will be described. As illustrated in FIG. 7, the beacon signal (advertisement packet) transmitted from the electronic apparatus 200 includes information indicating a radio wave intensity (signal strength indication value) as a reference of a distance. Further, the terminal apparatus 100 can acquire an actual received signal strength indication value when receiving the beacon signal.

The processing unit 110 of the terminal apparatus 100 obtains a distance between the terminal apparatus 100 and the electronic apparatus 200 based on the reception radio wave intensity of the beacon signal, and performs notification processing on the backup function in a case where the obtained distance is equal to or smaller than the predetermined threshold value.

The processing unit 110 compares the received signal strength indication value with the signal strength indication value as a reference of a distance that is included in the beacon signal. Assuming that a reception apparatus is provided at a position away from an apparatus transmitting a beacon signal by a reference distance, a signal strength indication value as a reference of a distance is a received signal strength indication (RSSI) value of the beacon signal at the reception apparatus. In an example of using a beacon signal (advertisement packet) based on a BLE standard, the transmission apparatus is a broadcaster and the reception apparatus is an observer. The reference distance is, for example, 1 m, and may be set to a different distance.

Figure 11:
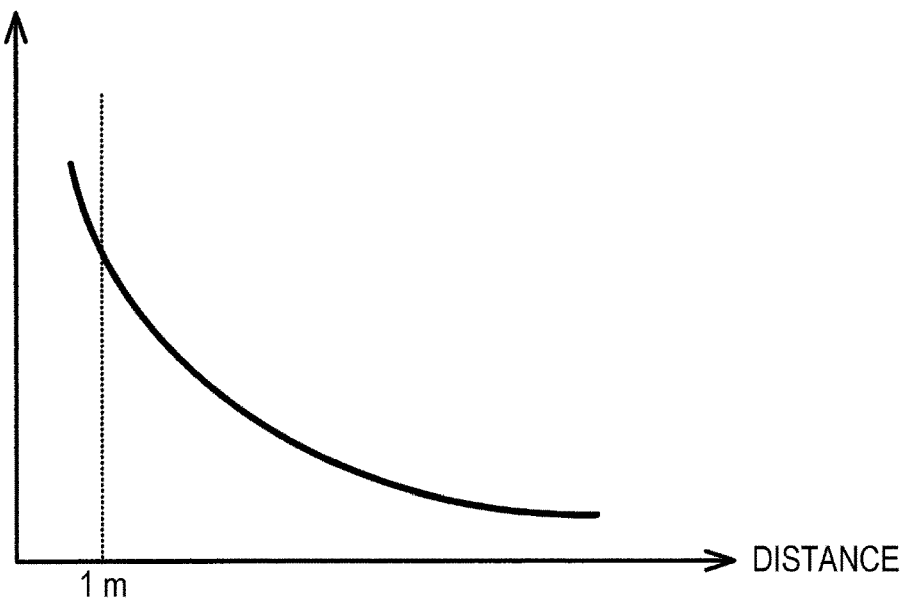
FIG. 11 is an example of a relationship between a distance and a reception radio wave intensity.

FIG. 11 is an example illustrating a relationship between a distance from an apparatus transmitting a beacon signal and a radio wave intensity of the beacon signal received at each distance. Generally, it is known that the radio wave intensity is decreased in inverse proportion to the square of the distance. Thus, when a radio wave intensity at a reference distance (the signal strength indication value) is known, a distance between the terminal apparatus 100 and the electronic apparatus 200 can be calculated based on the radio wave intensity of the actually-received beacon signal. The processing unit 110 stores a relationship expression corresponding to the relationship of FIG. 11 in the storage unit 160, and calculates a distance by substituting the signal strength indication value as a reference of a distance and the actually-measured received signal strength indication value into the expression. Alternatively, the processing unit 210 may store the relationship of FIG. 11 as a table (look-up table) in the storage unit 160, and obtain a distance by retrieving appropriate data from the table based on the signal strength indication value as a reference of a distance and the actually-measured received signal strength indication value.

Alternatively, the reference distance of the signal strength indication value to be included in the beacon signal may be matched with a distance threshold value in notification processing. For example, in a case where a predetermined threshold value is "1 m", a received signal strength indication value when an observer is provided at a position away from a broadcaster by 1 m is included in the beacon signal. For example, in a case where a different distance (for example, 50 cm) is used as a predetermined threshold value, a received signal strength indication value when an observer is provided at a position away from a broadcaster by 50 cm is included in the beacon signal.

In this case, the processing unit 110 performs comparison processing of the signal strength indication value and a received signal strength indication value of the beacon signal. When the received signal strength indication value is equal to or larger than the signal strength indication value as a reference of a distance, it can be determined that the distance between the terminal apparatus 100 and the electronic apparatus 200 is equal to or smaller than the predetermined threshold value, and when the received signal strength indication value is smaller than the signal strength indication value as a reference of a distance, it can be determined that the distance between the terminal apparatus 100 and the electronic apparatus 200 is larger than the predetermined threshold value. The processing unit 110 may perform comparison processing of radio wave intensity values. In this case, it is not necessary to directly calculate the distance itself, and thus a processing load can be reduced. Here, even in this example, there is no difference in that the processing unit 110 performs distance determination as to whether or not the distance is equal to or smaller than the predetermined threshold value. That is, in the present embodiment, "a case where it is determined that the distance between the terminal apparatus 100 and the electronic apparatus 200 is equal to or smaller than the predetermined threshold value" includes a case where the determination is made by actually obtaining the distance using an expression or a table, and also includes a case where the determination is made based on comparison processing of radio wave intensity values.

Next, a distance threshold value will be described. At home, office, or the like, a user may move around the printer unintentionally in daily activities. For this reason, in a case where a threshold value is excessively large, a frequency with which it is determined that the distance from the electronic apparatus 200 is equal to or smaller than the predetermined threshold value is increased. In some cases, an execution frequency of notification processing is increased, and as a result, the user may feel annoyance. Therefore, preferably, a threshold value (hereinafter, referred to as a first threshold value) when performing the notification processing of prompting an execution of backup is set to a small value to some extent. For example, the first threshold value is a distance of approximately 1 m.

On the other hand, the function-guide notification processing of guiding a backup function is processing that is considered as a premise of a backup execution, and thus it is preferable to execute the function-guide notification processing as soon as possible. Particularly, in an example of performing the function-guide notification processing when the beacon signal is received for the first time, the function-guide notification processing is not repeated, and thus a possibility that a user feels annoyance is low. In other words, preferably, the threshold value when performing the function-guide notification processing of guiding a backup function is set to a large value to some extent. Here, the threshold value (hereinafter, referred to as a third threshold value and a second threshold value will be described later) is set to a value larger than at least the first threshold value. The third threshold value may be regarded as a limit distance indicating a range in which the terminal apparatus 100 can receive the beacon signal, rather than having a specific value. That is, in a case where the beacon signal is received, the terminal apparatus 100 may perform the function-guide notification processing of guiding a backup function, and may skip a specific distance determination.

In addition, in a case where a backup execution operation by a user is not performed after the notification processing of prompting an execution of backup, the processing unit 110 stops the notification processing until it is determined that the distance from the electronic apparatus 200 exceeds a second threshold value equal to or larger than the threshold value (first threshold value).

Here, the case where a backup execution operation by a user is not performed corresponds to a case where a user performs an operation to reject an execution of backup, for example, a case where a user touches the "No" button in the example of FIG. 6. Here, the case where a backup execution operation is not performed is not limited to a case where a user actively performs a rejection operation. For example, in the example of FIG. 6, in a case where a predetermined time has elapsed without any operation of "Yes" or "No", the processing unit 110 may determine that a backup execution operation is not performed.

In a case where a backup execution operation by a user is not performed, it can be assumed that a user does not intend to execute backup at least when executing the notification processing of prompting an execution of backup. In a situation where a user does not intend to execute backup, when the notification processing of prompting an execution of backup is repeated, this only makes the user feel annoyance and does not provide useful notification.

Therefore, the processing unit 110 stops the notification processing until it is determined that the distance from the electronic apparatus 200 exceeds the second threshold value. In other words, a fact that the distance from the electronic apparatus 200 exceeds the second threshold value is set as one condition for restarting the notification processing. In this case, in a case where a backup execution operation is not performed, an execution of the next notification processing requires a condition that the distance from the electronic apparatus 200 exceeds the second threshold value and thereafter the distance from the electronic apparatus 200 is equal to or smaller than the first threshold value. Therefore, notification processing with low necessity is prevented from being performed.

Here, the second threshold value as a condition of stop and restart of the notification processing may be common to the first threshold value. In this case, as long as a state where the distance from the electronic apparatus 200 is equal to or smaller than the first threshold value is maintained, the notification processing is stopped, and thus unnecessary notification processing can be prevented from being performed. In this case, in a case where the distance between the terminal apparatus 100 and the electronic apparatus 200 becomes larger than the first threshold value and thereafter the distance becomes equal to or smaller than the first threshold value, the notification processing is executed. For this reason, in a case where the distance between the terminal apparatus 100 and the electronic apparatus 200 is close to the first threshold value, when a position of the terminal apparatus 100 slightly changes, there is a possibility that the notification processing may be repeated.

Therefore, the second threshold value may be a value larger than the first threshold value, and is, for example, a distance of approximately 10 m. In this case, the notification processing is executed on condition that the terminal apparatus 100 is away from the electronic apparatus 200 by 10 m or more and thereafter approaches the electronic apparatus 200 again to a distance of 1 m or less. In this case, in a case where a possibility that a situation of a user is changed is high, the notification processing is performed again, and thus it is possible to prevent unnecessary notification processing that makes the user feel annoyance from being performed.

As described above, a plurality of distance threshold values according to the present embodiment may be used (two of the first threshold value and the second threshold value, or three of the first to third threshold values). In the embodiment in which the processing unit 110 obtains a distance by using an expression or a table, the processing unit 110 can perform appropriate notification processing by comparing the obtained distance with each of the threshold values. Here, in a case where the determination is performed by comparing the radio wave intensities without obtaining the distance, it is necessary to make the reference distance of the signal strength indication value included in the beacon signal match with the distance threshold value. Therefore, in a case where the plurality of threshold values are used, the beacon signal includes information indicating a plurality of signal strength indication values. For example, in a case where both of the first threshold value (1 m) and the second threshold value (10 m) are used, the beacon signal includes information indicating the received signal strength indication value when the observer is provided at a position away from the broadcaster by 1 m, and information indicating the received signal strength indication value when the observer is provided at a position away from the broadcaster by 10 m.

2.5 Backup Processing

In a case where a "Yes" button is touched on the screen of FIG. 6, the processing unit 110 transmits the backup data to the electronic apparatus 200, and the electronic apparatus 200 stores the data transmitted from the terminal apparatus 100. A storage destination of the data may be the storage unit 260 of the electronic apparatus 200 as described above, or may be an external storage device such as an HDD connected to the electronic apparatus 200.

Here, various communication paths of the backup data from the terminal apparatus 100 to the electronic apparatus 200 are considered. For example, the processing unit 110 of the terminal apparatus 100 performs processing of transmitting the backup data to the electronic apparatus 200 by using communication based on the same communication standard as the communication standard of the beacon signal. In a case where the beacon signal is an advertisement packet based on a BLE standard, the communication unit 120 of the terminal apparatus 100 starts BLE communication connection after receiving the advertisement packet. After a connection is established between the communication unit 120 (a wireless communication device based on a BLE standard) of the terminal apparatus 100 and the communication unit 220 (a wireless communication device based on a BLE standard) of the electronic apparatus 200 (bonding is performed), the backup data is transmitted from the terminal apparatus 100 to the electronic apparatus 200 by using BLE communication.

Here, a transmission speed of the BLE communication is slow, and thus it cannot be said that the BLE communication is suitable for transmission of a file such as picture data that has a relatively large data size. In particular, in a case where the number of pictures is large, it takes a long time to complete transmission of the backup data.

Therefore, the processing unit 110 may perform processing of transmitting the backup data to the electronic apparatus 200 by using communication based on a communication standard different from the communication standard of the beacon signal.

Figure 12:
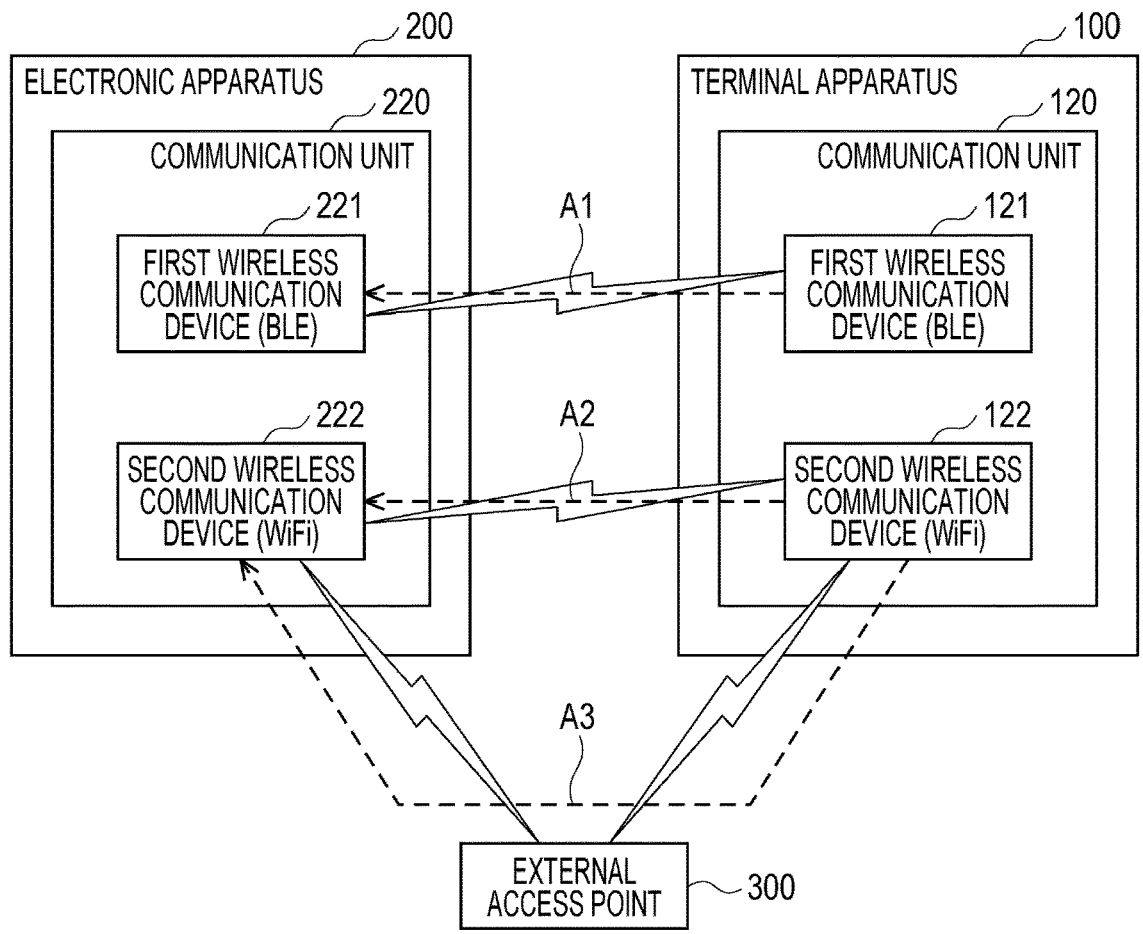
FIG. 12 is an explanatory diagram of a communication path of backup data.

FIG. 12 is a schematic diagram for explaining a communication path of the backup data from the terminal apparatus 100 to the electronic apparatus 200. As illustrated in FIG. 12, the communication unit 120 of the terminal apparatus 100 includes a first wireless communication device 121 (a BLE chip and a BLE module) that performs communication based on the BLE standard and a second wireless communication device 122 that performs communication based on a communication standard different from the BLE standard. The second wireless communication device 122 is, for example, a device (Wi-Fi module) that performs communication based on a Wi-Fi standard. Similarly, the communication unit 220 of the electronic apparatus 200 includes a first wireless communication device 221 that performs communication based on the BLE standard and a second wireless communication device 222 that performs communication based on a communication standard different from the BLE standard.

The transmission and reception of the beacon signal is performed by the first wireless communication devices 121 and 221. In addition, in a case where a transmission speed does not matter, as indicated by a communication path A1 of FIG. 12, the backup data may be transmitted by the first wireless communication devices 121 and 221.

Alternatively, the backup data may be transmitted by the second wireless communication devices 122 and 222. That is, the backup data is transmitted by using communication based on the Wi-Fi standard. Here, the communication based on the Wi-Fi standard may be communication using Wi-Fi Direct (WFD) or communication using an external access point (for example, a wireless LAN router).

A communication path A3 of FIG. 12 is communication using an external access point, each of the second wireless communication devices 122 and 222 performs connection to an external access point 300, and the terminal apparatus 100 transmits the backup data to the electronic apparatus 200 by using communication via the external access point 300. The communication unit 220 of the electronic apparatus 200 includes a communication device that performs communication by wired connection, and may be connected to the external access point 300 by wired connection (for example, using a wired LAN cable).

On the other hand, a communication path A2 of FIG. 12 is communication using WFD, and the terminal apparatus 100 and the electronic apparatus 200 perform direct communication without passing through the external access point 300. For example, the second wireless communication device 222 of the electronic apparatus 200 activates an internal access point (software access point), and the second wireless communication device 122 of the terminal apparatus 100 performs connection to the internal access point.

In any one of the communication paths A2 and A3 of FIG. 12, communication based on the Wi-Fi standard is performed, and thus high-speed data transmission can be performed as compared with the BLE communication. The communication based on the BLE standard is suitable for determining a distance between apparatuses, and the communication based on the Wi-Fi standard has a characteristic that the transmission speed is relatively fast. Thus, by using the communication paths A2 and A3 for transmission of the backup data, it is possible to realize efficient communication considering each communication characteristic.

As a method of handling the data stored in the storage unit 160 of the terminal apparatus 100 after transmitting the backup data to the electronic apparatus 200, various methods are considered. For example, from a viewpoint of data multiplexing, it is considered to leave the data after backup in the storage unit 160 of the terminal apparatus 100 as it is. Alternatively, from a viewpoint of increasing a free space of the storage unit 160, the data after backup may be deleted from the storage unit 160.

In a case where the data after backup is completely deleted from the storage unit 160, the terminal apparatus 100 does not recognize which data is backed up. For example, a user cannot view the picture captured by himself/herself in the terminal apparatus 100. Therefore, the processing unit 110 may generate reduced image data (thumbnail) of the data after backup, delete the original data, and hold the reduced image data. In this case, it is possible to increase the free space of the storage unit 160 and confirm the data after backup in the terminal apparatus 100.

2.6 Flow of Specific Processing

Details of the above-described processing will be described with reference to flowcharts. The following flowchart is an example of the processing, and various modifications such as omission of partial processing, addition of other processing, or change of a processing order may be made.

Figure 13:
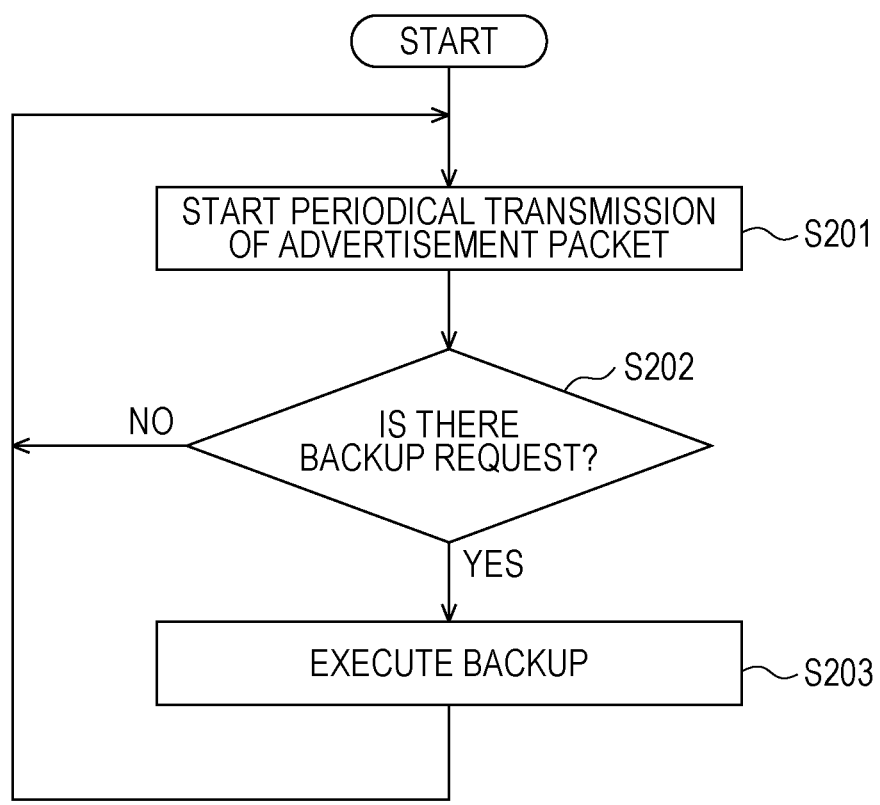
FIG. 13 is a flowchart for explaining processing of the electronic apparatus.

FIG. 13 is a flowchart for explaining processing of the electronic apparatus 200 (printer). When processing is started, the electronic apparatus 200 periodically transmits a beacon signal (S201), and determines whether or not there is a backup request from an apparatus that receives the beacon signal (S202).

In a case where there is no request (No in S202), the electronic apparatus 200 returns to S201 and continues transmission processing of a beacon signal. In a case where there is a request (Yes in S202), the electronic apparatus 200 executes backup processing (S203). In S203, the electronic apparatus 200 receives backup data from the terminal apparatus 100 via one of the paths of FIG. 12, and performs processing of writing the received data in a predetermined storage device (storage unit 260 or external storage device).

Figure 14:
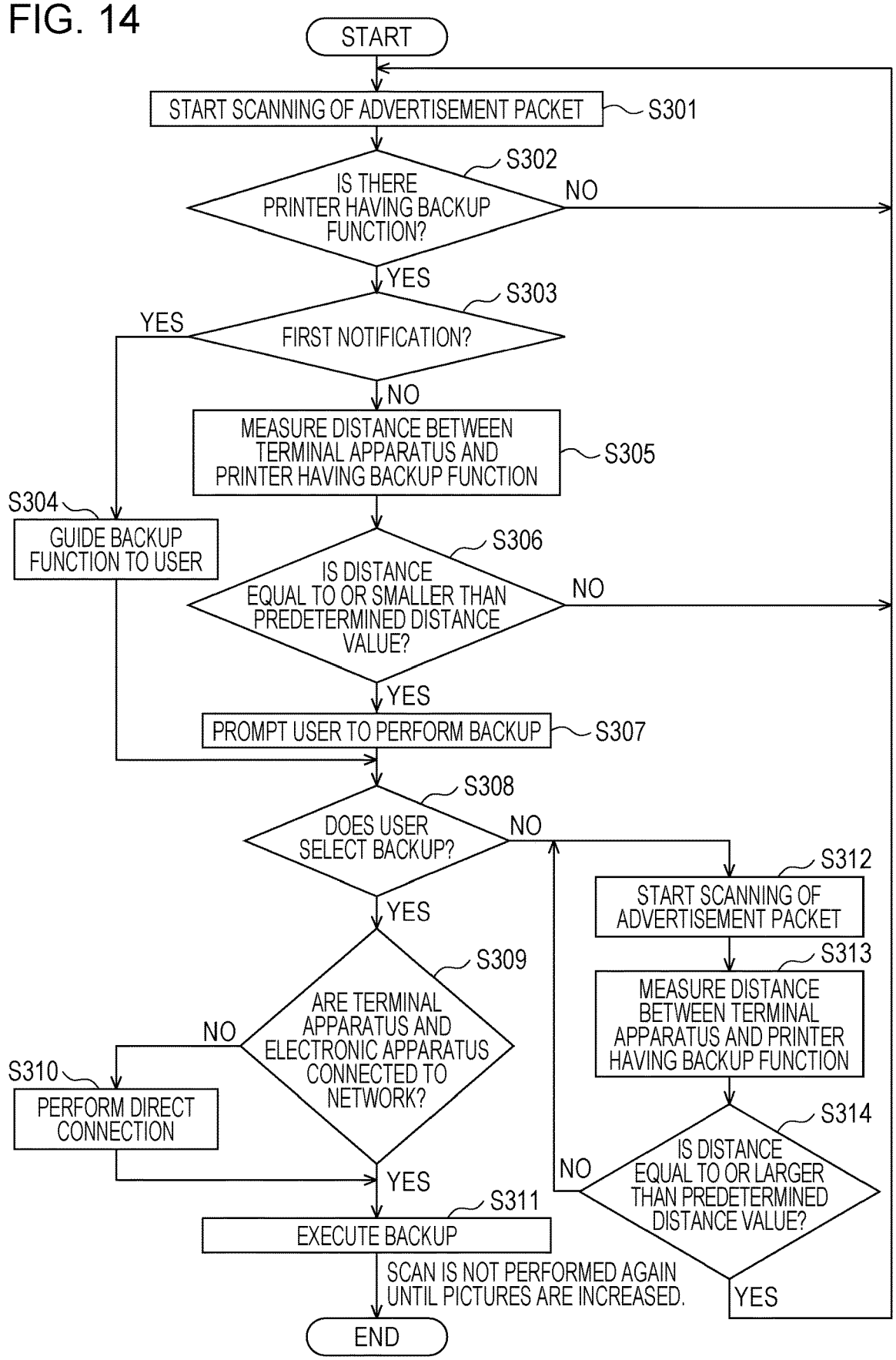
FIG. 14 is a flowchart for explaining processing of the terminal apparatus.

FIG. 14 is a flowchart for explaining processing of the terminal apparatus 100. When processing is started, the terminal apparatus 100 starts reception of a beacon signal (scanning of an advertisement packet) (S301). In a case where a beacon signal is received, the terminal apparatus 100 determines whether or not the electronic apparatus 200 as a transmission source has a backup function based on the beacon signal (S302). In a case where the electronic apparatus 200 does not have a backup function (No in S302), the terminal apparatus 100 returns to S301 and continues reception of a beacon signal.

In a case where the electronic apparatus 200 has a backup function (Yes in S302), the terminal apparatus 100 determines whether or not notification related to the backup function is the first time (S303). The processing of S303 is performed by using the notification history information or the reception history information of the beacon signal as described above.

In a case where it is determined that notification related to the backup function is the first time (Yes in S303), the terminal apparatus 100 performs function-guide notification processing of guiding the backup function (S304). FIG. 14 is an example in which estimation of the specific distance is omitted and the function-guide notification processing is performed in a case where the terminal apparatus 100 is within a distance at which the beacon signal can be received.

In a case where it is determined that notification related to the backup function is not the first time (No in S303), the terminal apparatus 100 estimates a distance from the electronic apparatus 200 based on the reception radio wave intensity of the beacon signal (S305), and determines whether or not the estimated distance is equal to or smaller than the first threshold value (S306). In a case where the distance is larger than the first threshold value (No in S306), the terminal apparatus 100 returns to S301 without performing the notification processing, and restarts reception of the beacon signal. In a case where the distance is equal to or smaller than the first threshold value (Yes in S306), the terminal apparatus 100 performs notification processing of prompting an execution of backup (S307). As described above, the embodiment may be modified. For example, the terminal apparatus 100 may determine whether or not backup data (picture data) is increased before S307, perform the processing of S307 in a case where backup data is increased, and return to S301 in a case where backup data is not increased.

After the processing of S304 or S307, the terminal apparatus 100 determines whether or not a backup execution operation by a user is performed (S308). In a case where a backup execution operation is performed (Yes in S308), the terminal apparatus 100 determines whether or not each of the terminal apparatus 100 and the electronic apparatus 200 is connected to the network (S309). The processing of S309 corresponds to the determination processing as to whether or not the communication path of A3 of FIG. 12 is available.

In a case where each of the terminal apparatus 100 and the electronic apparatus 200 is not connected to the network (No in S309), the terminal apparatus 100 performs direct connection with the electronic apparatus 200 (S310). The processing of S310 corresponds to the processing of establishing the communication path A2 of FIG. 12.

In the case where each of the terminal apparatus 100 and the electronic apparatus 200 is connected to the network (Yes in S309), or after the processing of S310, the terminal apparatus 100 executes backup (S311). Specifically, the terminal apparatus 100 performs processing such as selection of backup data, transmission of the backup data, deletion of the original data, and generation of a thumbnail image. The transmission of the backup data is performed by using the communication path A3 in a case of Yes in S309, or is performed by using the communication path A2 in a case where the processing of S310 is executed. As a modified embodiment, the transmission of the backup data may be performed by using the communication path A1 of FIG. 12.

In a case where a backup execution operation by a user is not performed after the notification processing (No in S308), as described above, the terminal apparatus 100 performs determination using the second threshold value such that excessive notification processing is not executed. More specifically, the terminal apparatus 100 starts reception of a beacon signal (S312). The terminal apparatus 100 estimates a distance from the electronic apparatus 200 based on the received beacon signal (S313), and determines whether or not the estimated distance is equal to or larger than the second threshold value (S314). In a case where the distance is smaller than the second threshold value (No in S314), the terminal apparatus 100 returns to S312 and continues reception of a beacon signal. In a case where the distance is equal to or larger than the second threshold value (Yes in S314), the terminal apparatus 100 returns to S301. In this case, in a case where the distance is smaller than the second threshold value, the processing of S312 to S314 is looped, and thus unnecessary notification processing (processing of S307) can be prevented from being performed.

Unless the electronic apparatus 200 that is subjected to the determination processing (S312 to S314) using the second threshold value and the electronic apparatus 200 that is subjected to the processing of S305 to S308 are the same, the processing is meaningless. Therefore, the terminal apparatus 100 identifies the electronic apparatus 200 as a target of processing based on the beacon signal. In the example of FIG. 7, the terminal apparatus 100 determines an identity of the electronic apparatus 200 based on the identification information (MAC address) of the electronic apparatus 200 that is included in the beacon signal.

3. Modification Example

Hereinafter, modification examples will be described.

FIG. 6 illustrates an example in which a backup execution operation (touch of a "Yes" button) by a user is performed and backup is executed in response to the operation. In this case, backup can be executed in a case where there is a permission of a user. Here, the permission of a user is not required every time backup is executed.

The processing unit 110 of the terminal apparatus 100 may acquire setting information indicating use or non-use of automatic backup, and skip the notification processing and perform processing of transmitting a backup request to the electronic apparatus 200 in a case where it is determined that the distance is equal to or smaller than the predetermined threshold value (first threshold value) and it is determined that the automatic backup is available based on the setting information.

Figure 15:
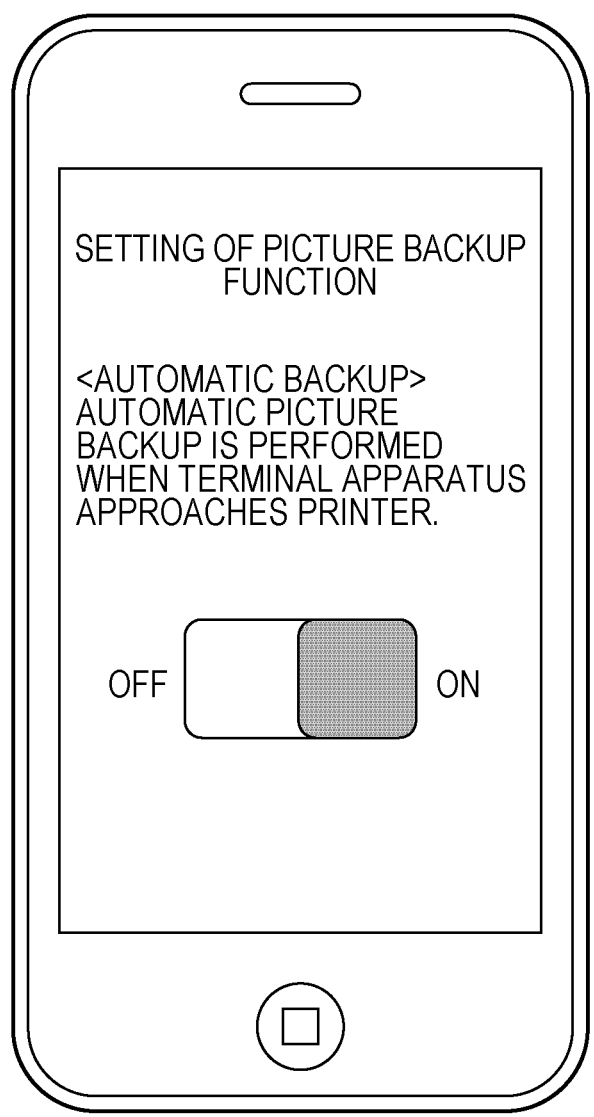
FIG. 15 is an example of a display screen used in automatic backup processing.

FIG. 15 is an example of a screen displayed on the display unit 130 of the terminal apparatus 100 in the present modification example. The screen of FIG. 15 is displayed, for example, in association with the screen of FIG. 8 displayed in the function-guide notification processing of guiding a backup function. More specifically, in a case where any operation is performed on the screen of FIG. 8, the screen may be transition to the screen of FIG. 15, or by scrolling the screen of FIG. 8, the screen of FIG. 15 may be displayed.

FIG. 15 illustrates an automatic backup setting screen, and in FIG. 15, an operation bar for on/off switching of automatic backup is displayed together with text information indicating that automatic backup is available. Here, in a case where automatic backup is set to on, by the setting operation, it can be determined that a user permits automatic backup. Therefore, in a case where setting of automatic backup is on, the terminal apparatus 100 executes backup processing without receiving a backup execution operation by a user. Specifically, it is unnecessary to receive an operation on the screen of FIG. 6, and it is also unnecessary to display the screen illustrated in FIG. 6.

Figure 16:
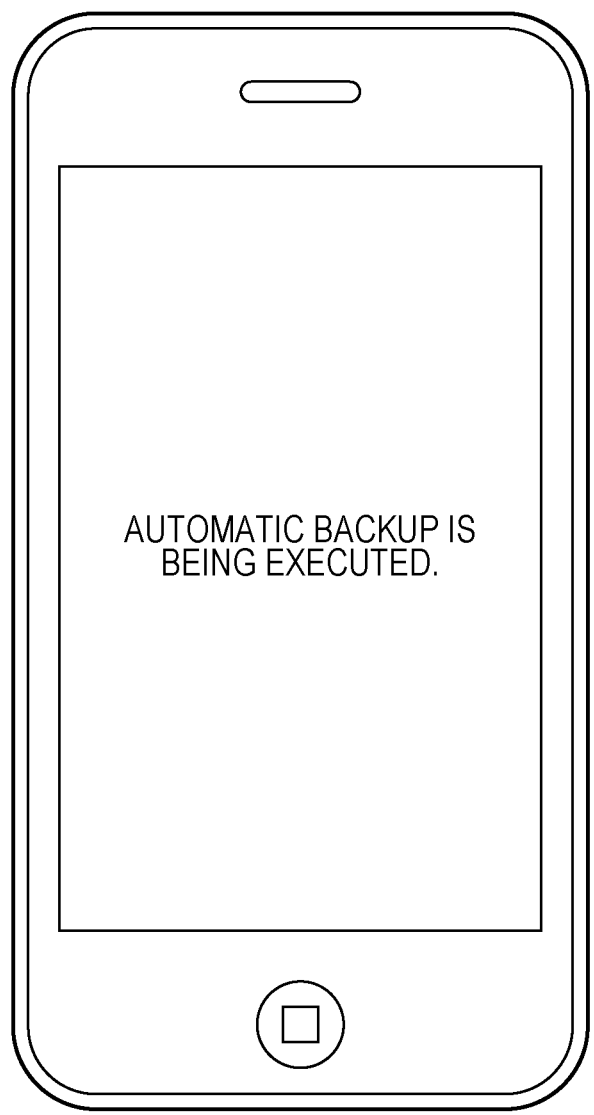
FIG. 16 is an example of a display screen used in automatic backup processing.

FIG. 16 is an example of a screen displayed on the display unit 130 in a case where automatic backup setting is set to on and the distance between the terminal apparatus 100 and the electronic apparatus 200 is equal to or smaller than the first threshold value. In this case, the screen of FIG. 6 is not displayed, and in response to the fact that the distance is equal to or smaller than the first threshold value, the backup data is transmitted to the electronic apparatus 200. By displaying the screen of FIG. 16 on the display unit 130, the processing unit 110 notifies a user that automatic backup is being executed. Here, notification indicating that automatic backup is being executed may be performed by displaying a screen other than the screen of FIG. 16, or may be performed in other modes such as a sound and vibration. Alternatively, after completion of backup, notification indicating backup completion may be performed.

In addition, as illustrated in FIG. 1, the method according to the present embodiment can be applied to the communication system 10 including the terminal apparatus 100 and the electronic apparatus 200. The electronic apparatus 200 is an apparatus that has a backup function and transmits a beacon signal.

In addition, a part or most of the processing of the terminal apparatus 100 and the electronic apparatus 200 according to the present embodiment may be realized by a program. In this case, a processor such as a CPU executes the program, and thus the terminal apparatus 100 and the like according to the present embodiment are realized. Specifically, the program stored in a non-transitory information storage medium is read, and the read program is executed by a processor such as a CPU. Here, the information storage medium (computer-readable storage medium) stores programs, data, and the like, and a function thereof is realized by an optical disk (DVD, CD, or the like), a hard disk drive (HDD), or a memory (card type memory, ROM, or the like). The processor such as a CPU performs various processing according to the present embodiment based on the program (data) stored in the information storage medium. That is, the information storage medium stores a program (a program for causing a computer to execute processing of each unit) for causing a computer (an apparatus including an operation unit, a processing unit, a storage unit, and an output unit) to function as each unit according to the present embodiment.

That is, the method according to the present embodiment can be applied to a program, the program causing a computer to function as: a communication unit 120 that receives a beacon signal from an electronic apparatus 200; and a processing unit 110 that controls communication of the communication unit 120, in which the processing unit 110 performs notification processing of a backup function of backup data into the electronic apparatus 200 in a case where it is determined that the electronic apparatus 200 from which the beacon signal is transmitted is an apparatus having a backup function and that a distance from the electronic apparatus is equal to or smaller than a predetermined threshold value based on a reception radio wave intensity of the beacon signal.

Considering setting of the automatic backup, the method according to the present embodiment can be applied to a program, the program causing a computer to function as: a communication unit 120 that receives a beacon signal from an electronic apparatus 200; and a processing unit 110 that controls communication of the communication unit 120, in which the processing unit 110 performs automatic backup processing of backup data into the electronic apparatus 200 in a case where it is determined that the electronic apparatus 200 from which the beacon signal is transmitted is an apparatus having a backup function and that a distance from the electronic apparatus 200 is equal to or smaller than a predetermined threshold value based on a reception radio wave intensity of the beacon signal.

As described above, the embodiments and the modification examples according to the invention have been described by way of example only, and are not intended to limit the scope of the invention. The invention can be embodied by modifying components at a stage of implementation within the scope not deviating from the gist of the invention. In addition, various inventions can be made by appropriately combining a plurality of components disclosed in each of the above-described embodiments and modification examples. For example, some components may be deleted from all components described in each of the embodiments and the modification examples. In addition, components described in different embodiments and modification examples may be appropriately combined. Further, in the specification or the drawings, a term described at least once together with a different term having a wider sense or an equivalent sense may be replaced with the different term in any portion of the specification or the drawings. As described above, various modifications and applications may be made without departing from the gist of the invention.

The entire disclosure of Japanese Patent Application No. 2017-171099, filed Sep. 6, 2017 is expressly incorporated by reference herein.

What is claimed is:

1. A non-transitory computer-readable recording medium in which a program is recorded, the program causing a computer to function as:
a communication unit that receives a beacon signal from an electronic apparatus, the beacon signal including (1) information indicating presence or absence of backup function, and (2) a strength indication value indicating source strength of the beacon signal; and
a processing unit that controls communication of the communication unit,
wherein the processing unit:
determines whether the electronic apparatus has a backup function based on the information indicating presence or absence of backup function contained in the beacon signal;
when it is determined that the electronic apparatus has the backup function, accesses a notification history to determine whether a notification related to the backup function has been previously performed;
in response to determining that no notification related to the backup function has been previously performed, performs a first notification process;
in response to determining that at least one notification related to the backup function has been previously performed, performs a second notification process that is different from the first notification process in a case where it is determined that a distance from the electronic apparatus is equal to or smaller than a predetermined first threshold value based on a reception radio wave intensity of the beacon signal and the strength indication value contained in the beacon signal; and
after the processing unit performs either a first notification process or a second notification process, the processing unit stops the notification processing until it is determined that the distance from the electronic apparatus exceeds a second threshold value that is larger than the first threshold value.

2. The non-transitory computer-readable recording medium according to claim 1,
wherein the first notification process or the second notification process includes at least one of notification processing of prompting an execution of backup and function-guide notification processing of guiding the backup function.

3. The non-transitory computer-readable recording medium according to claim 1,
wherein the processing unit determines whether or not the electronic apparatus from which the beacon signal is transmitted is an apparatus having the backup function based on information included in the beacon signal.

4. The non-transitory computer-readable recording medium according to claim 1,
wherein the processing unit obtains the distance from the electronic apparatus based on the reception radio wave intensity of the beacon signal, and performs the notification processing of the backup function in a case where the obtained distance is equal to or smaller than the predetermined first threshold value.

5. The non-transitory computer-readable recording medium according to claim 1,
wherein the processing unit performs function-guide notification processing of guiding a fact that the electronic apparatus has the backup function when the beacon signal is received from the electronic apparatus for the first time.

6. The non-transitory computer-readable recording medium according to claim 5,
wherein the processing unit performs the notification processing of prompting an execution of backup when the beacon signal is received from the electronic apparatus for a second or subsequent time.

7. The non-transitory computer-readable recording medium according to claim 1,
wherein the notification processing of the backup function is notification processing of prompting an execution of backup, and
wherein, in a case where a backup execution operation by a user is not performed after the notification processing of prompting an execution of the backup, the processing unit stops the notification processing until it is determined that the distance from the electronic apparatus exceeds a second threshold value equal to or larger than the threshold value.

8. The non-transitory computer-readable recording medium according to claim 1,
wherein the processing unit acquires setting information indicating use or non-use of automatic backup, and
wherein the processing unit skips the notification processing and performs processing of transmitting a backup request to the electronic apparatus in a case where it is determined that the distance is equal to or smaller than the predetermined threshold value and it is determined that the automatic backup is available based on the setting information.

9. The non-transitory computer-readable recording medium according to claim 1,
wherein the beacon signal is a signal based on a Bluetooth communication standard.

10. The non-transitory computer-readable recording medium according to claim 1,
wherein the processing unit performs processing of transmitting the backup data to the electronic apparatus by using communication based on a communication standard different from a communication standard of the beacon signal.

11. A non-transitory computer-readable recording medium of claim 1, wherein the first notification process is performed in a case where it is determined that a distance from the electronic apparatus is equal to or smaller than a predetermined third threshold value that is at least larger than the first threshold value.

12. A non-transitory computer-readable recording medium of claim 1, wherein the electronic apparatus is a printing apparatus configured to backup picture data.

13. A non-transitory computer-readable recording medium in which a program is recorded, the program causing a computer to function as:
a communication unit that receives a beacon signal from an electronic apparatus, the beacon signal including (1) information indicating presence or absence of backup function, and (2) a strength indication value indicating source strength of the beacon signal; and
a processing unit that controls communication of the communication unit,
wherein the processing unit:
determines whether the electronic apparatus has a backup function based on the information indicating presence or absence of backup function contained in the beacon signal;
when it is determined that the electronic apparatus has the backup function, accesses a notification history to determine whether a notification related to the backup function has been previously performed;
in response to determining that no notification related to the backup function has been previously performed, performs a notification process;
in response to determining that at least one notification related to the backup function has been previously performed, performs automatic backup processing of backup data into the electronic apparatus in a case where it is determined that a distance from the electronic apparatus is equal to or smaller than a predetermined first threshold value based on a reception radio wave intensity of the beacon signal and the strength indication value contained in the beacon signal; and
after the processing unit performs either a first notification process or a second notification process, the processing unit stops the notification processing until it is determined that the distance from the electronic apparatus exceeds a second threshold value that is larger than the first threshold value.

14. A terminal apparatus comprising:
a communication unit that receives a beacon signal from an electronic apparatus, the beacon signal including (1) information indicating presence or absence of backup function, and (2) a strength indication value indicating source strength of the beacon signal; and
a processing unit that controls communication of the communication unit,
wherein the processing unit:
determines whether the electronic apparatus has a backup function based on the information indicating presence or absence of backup function contained in the beacon signal;
when it is determined that the electronic apparatus has the backup function, accesses a notification history to determine whether a notification related to backup has been previously performed;
in response to determining that no notification related to backup has been previously performed, performs a first notification process;
in response to determining that at least one notification related to the backup function has been previously performed, performs a second notification process of a backup function of backup data into the electronic apparatus in a case where it is determined that a distance from the electronic apparatus is equal to or smaller than a predetermined first threshold value based on a reception radio wave intensity of the beacon signal and the strength indication value contained in the beacon signal; and
after the processing unit performs either a first notification process or a second notification process, the processing unit stops the notification processing until it is determined that the distance from the electronic apparatus exceeds a second threshold value that is larger than the first threshold value.

15. A communication system comprising:
a terminal apparatus according to claim 14; and an electronic apparatus that has a backup function and transmits a beacon signal.

* * * * *